(12) United States Patent
Grunder et al.

(10) Patent No.: US 12,134,716 B2
(45) Date of Patent: Nov. 5, 2024

(54) ADHESIVE COMPOSITION

(71) Applicant: DDP SPECIALTY ELECTRONIC MATERIALS US, LLC, Wilmington, DE (US)

(72) Inventors: Sergio Grunder, Freienbach (CH); Stefan Schmatloch, Freienbach (CH); Joel Kunz, Horgen (CH)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 1071 days.

(21) Appl. No.: 16/975,490

(22) PCT Filed: Feb. 20, 2019

(86) PCT No.: PCT/US2019/018722
§ 371 (c)(1),
(2) Date: Aug. 25, 2020

(87) PCT Pub. No.: WO2019/173049
PCT Pub. Date: Sep. 12, 2019

(65) Prior Publication Data
US 2021/0032516 A1 Feb. 4, 2021

Related U.S. Application Data

(60) Provisional application No. 62/639,670, filed on Mar. 7, 2018.

(51) Int. Cl.
| | | |
|---|---|---|
| C08G 18/16 | (2006.01) | |
| C08G 18/00 | (2006.01) | |
| C08G 18/10 | (2006.01) | |
| C08G 18/18 | (2006.01) | |
| C08G 18/24 | (2006.01) | |
| C08G 18/32 | (2006.01) | |
| C08G 18/66 | (2006.01) | |
| C08G 18/76 | (2006.01) | |
| C08G 18/79 | (2006.01) | |
| C08K 3/04 | (2006.01) | |
| C08K 3/34 | (2006.01) | |
| C09J 175/08 | (2006.01) | |

(52) U.S. Cl.
CPC ............ *C09J 175/08* (2013.01); *C08G 18/00* (2013.01); *C08G 18/165* (2013.01); *C08G 18/1875* (2013.01); *C08G 18/246* (2013.01); *C08G 18/3206* (2013.01); *C08G 18/6677* (2013.01); *C08G 18/7664* (2013.01); *C08G 18/798* (2013.01); *C08K 3/04* (2013.01); *C08K 3/346* (2013.01)

(58) Field of Classification Search
CPC .. C09J 175/08; C08G 18/165; C08G 18/1875; C08G 18/246; C08G 18/3206; C08G 18/6677 18/6677
See application file for complete search history.

(56) References Cited

U.S. PATENT DOCUMENTS

| | | | |
|---|---|---|---|
| 6,423,810 B1 | 7/2002 | Huang et al. | |
| 10,392,542 B2 | 8/2019 | Schmatloch et al. | |
| 2009/0270582 A1* | 10/2009 | Seiler ................... | C08G 83/005 528/60 |
| 2011/0123786 A1* | 5/2011 | Johnson ............. | C08G 18/7671 428/221 |
| 2015/0210799 A1* | 7/2015 | Tanaka ............... | C08G 18/6674 525/453 |

FOREIGN PATENT DOCUMENTS

| | | | | |
|---|---|---|---|---|
| CN | 105238330 | | 1/2016 | |
| CN | 105602514 A | | 5/2016 | |
| CN | 106750119 | | 5/2017 | |
| WO | WO-2010085602 A1 * | | 7/2010 | ............. C08G 18/10 |
| WO | WO-2013043333 A1 * | | 3/2013 | ........... C08G 18/161 |

OTHER PUBLICATIONS

CN105602514 Abstract.
CN105238330, Jan. 13, 2016, Abstract.
CN106750119, May 31, 2017, Abstract.

* cited by examiner

*Primary Examiner* — Michael L Leonard

(57) ABSTRACT

A polyurethane adhesive composition, more specifically a two-component polyurethane adhesive, including (a) at least one isocyanate component, and (b) at least one polyol component, wherein the polyol component (b) includes (bi) at least one first polyol compound, (bii) at least one second polyol compound and (biii) at least one chain extender, and a process for making the above adhesive composition.

12 Claims, No Drawings

ADHESIVE COMPOSITION

FIELD

The present invention relates to an adhesive composition; and more specifically, the present invention relates to a two-component polyurethane adhesive composition which is particularly useful in automotive applications.

BACKGROUND

The use of re-enforced composites in modern vehicles design is growing due to performance advantages and light weight vehicle requirements. Adhesive joints are the most preferred assembly technology for composites, as bonding does not destroy the composite structure (other than mechanical fixation, such as for example screwing or riveting). Typically, the use of adhesives technologies for part assembly aims at optimizing production processes so as to achieve a fast adhesive application, rapid strength built-up and fast development of handling strength. In some cases, acceleration of adhesive application, adhesive strength built-up and development of adhesive handling strength can be achieved via heat processes. For example, infrared based heat processes, as opposed to heat curing using a conventional convection oven, can enable very short cycle times of, for example, 1-3 minutes (min) to achieve a lap shear strength after of greater than (>) 1.0 Mega-Pascal (MPa).

Additionally, for a process to provide a fast strength built up for an adhesive, flexibility in the process is required. Process flexibility is defined as a long open time. "Open time" is the time lapse between application of the adhesive on a first substrate and the joining of a second substrate to the first substrate. Furthermore, a long mixer stand-alone time is required to reduce flushing intervals and hence reducing the material waste generated by the process. "Mixer stand-alone time" is the period of time a mixed two-part or two-component (2K) adhesive can be kept in a mixer unit (static or dynamic) between two successive applications of the 2K adhesive without the adhesive gelling. After the two components of the 2K adhesive are mixed, it is desirable that the adhesive remain workable for as long as possible such that the adhesive is capable of bonding to a substrate. In addition to long open times, after a 2K adhesive has reached its open time at room temperature (RT; about 25 degrees Celsius (° C.)), an adhesive that exhibits a fast strength build-up is desired to provide handling strengths of the adhesive after a short time (for example, one hour (hr) or less). The aforementioned adhesives are generally latent adhesives. A "latent adhesive" means a 2K adhesive having a long open time (e.g., >8 min) followed by a fast cure time (e.g., faster than 60 min).

Polyurethanes (PU) are a well-known type of adhesive that come in a 2K type; and that may provide some of the benefits described above related to open time and fast cure time. A 2K PU adhesive consists of a resin component that includes one or more polyisocyanate compounds, and a curative component that includes one or more polyol compounds. When the two components (a) and (b) are mixed, the polyisocyanate compound(s) and the polyol compound(s) react to form a cured polyurethane adhesive. A polyurethane adhesive can be formulated to cure at room temperature or upon exposure to certain conditions, an example of which is an elevated temperature. As the adhesive cures, the adhesive can form a strong adhesive bond to many types of substrates.

A 2K PU adhesive can be used in a variety of applications and in one preferred embodiment, the 2K PU adhesive can be advantageously used in the construction of passenger vehicles, particularly when during construction of a passenger vehicle the welding of two dissimilar materials is difficult or even impossible to achieve. Two-component adhesive compositions are particularly useful where rapid cure is required for the application, especially where the two components are not shelf stable when in contact with one another. "Shelf stable" means that the composition does not cure in storage. It is desirable that the 2K PU adhesive composition exhibit a suitable "open time" and a rapid cure.

One way of obtaining both a long open time and a fast cure is by formulating the adhesive to have a heat-activated cure. Such adhesives cure slowly at ambient temperature, thereby allowing the adhesive to be applied to substrates and the substrates positioned while the adhesive remains workable. Thereafter, the resulting substrate assembly can be fully and rapidly cured at room temperature or at an elevated temperature to form an assembly having a strong bond.

It is desired to provide a 2K PU adhesive which offers increased latency that results in an improved adhesive having a longer open time as well as a fast handling strength build up while at the same time maintaining the mechanical properties of the adhesive.

SUMMARY

The present invention is directed to a two-component polyurethane (2K PU) adhesive composition (or formulation) including (a) at least one isocyanate component, and (b) at least one polyol component, wherein the polyol component comprises (bi) at least one first polyol compound, (bii) at least one second polyol compound having a functionality of >2 and an equivalent weight (EW) of less than (<) 200; and (biii) at least one chain extender, wherein the chain extender comprises a compound having 2 hydroxyl groups and an EW of <200. In one preferred embodiment, the adhesive composition may include (c) optionally, at least one catalyst; and in another preferred embodiment, the adhesive composition may include (d) optionally, at least one filler. The optional catalyst and/or filler can be added to the isocyanate component (a) and/or to the polyol component (b).

The present invention provides a 2K PU adhesive formulation with improved latency without compromising the mechanical properties of the present invention adhesive. The present invention also provides 2K PU adhesive composition that: (1) exhibits an increase open time for working with the adhesive; (2) is capable of being cured at ambient temperature; (3) is capable of bonding to various materials such as aluminum, magnesium, sheet molding compound, carbon fiber composites, and coated metals; and (4) is capable of bonding dissimilar materials.

DETAILED DESCRIPTION

"Isocyanate component (a)", or abbreviated as "IsoC", herein refers to an ingredient that includes one or more isocyanate functional polyisocyanate compounds wherein at least one of the molecules of polyisocyanate compound has at least one isocyanate (NCO) functional group. The IsoC can be a monomeric or polymeric compound or a mixture of such compounds.

"Polyol component (b)", or abbreviated as "PolC", herein refers to an ingredient that includes one or more polyol functional compounds wherein at least one of the molecules of the polyol functional compound has at least one polyol functional group. The PolC can be a monomeric or polymeric compound or a mixture of such compounds.

In one general embodiment, the present invention includes a polyurethane adhesive composition, more specifically a 2K PU adhesive, including (a) at least one isocyanate component, and (b) at least one polyol component, wherein the polyol component (b) includes: (bi) at least one first polyol compound, (bii) at least one second polyol compound, wherein the second polyol compound is different than the first polyol compound, and (biii) at least one chain extender. The novel adhesive of the present invention includes a high functional polyol (e.g., a polyol having a functionality of >2 and an EW of <200) as the second polyol component (bii) adapted for providing beneficial properties to the adhesive such as longer open time and faster strength build-up. Improved latency of the adhesives of the present invention can be derived from the increased crosslink density which leads to a reduced elongation at break of the adhesive. It has been surprisingly found that when a second polyol, such as a trifunctional small molecular weight glycerin molecule is used to form the adhesive composition of the present invention, the latency of the adhesive composition is improved and the mechanical properties of the adhesive composition are not compromised. It has also been unexpectedly found that when a trifunctional chain extender (such as for example glycerin) is used in the present invention 2K PU adhesive composition, the latency of the 2K PU adhesive can be improved resulting in a 2K PU adhesive having a longer open time and a faster strength build-up without compromising the mechanical properties of the 2K PU adhesive such elongation at break.

The 2K PU adhesive formulation of the present invention includes at least one isocyanate component, as component (a) of the formulation, i.e., the isocyanate component (a) useful in the present invention may include one or more isocyanate-containing compounds. Thus, the isocyanate component, component (a) of the adhesive formulation of the present invention, can be (1) at least one isocyanate-containing monomer compound, (2) a mixture of compounds wherein at least one of the compounds in the mixture is an isocyanate-containing monomer compound, (3) at least one isocyanate-containing polymer or prepolymer compound, or (4) a mixture of an isocyanate-containing monomer compound and an isocyanate-containing polymer or prepolymer compound.

For example, the component (a) useful in the adhesive formulation of the present invention may include aromatic polyisocyanate compounds, aliphatic polyisocyanate compounds, or mixtures thereof; and such polyisocyanate compounds can be added to the adhesive formulation as monomer compounds or as prepolymer compounds. Some embodiment of polyisocyanate compounds useful in the present invention include, for example, aromatic MDI (methylene diphenyl diisocyanate) such as Isonate® 143 which is a liquified MDI with a functionality of 2.2 and a viscosity of 40 mPa-s; Isonate 220 which is a polymeric MDI with a functionality of 2.7 and a viscosity of 220 mPa-s; 4,4'-methylenediphenyldiisocyanate; 2,2'-methylenediphenyldiisocyanate; 2,4-methylenediphenyldiisocyanate; and mixtures thereof. Isonate is a trademark of The Dow Chemical Company and Isonate products are available from The Dow Chemical Company.

Aliphatic polyisocyanate compounds useful in the present invention may include for example Desmodur N3400 and Desmodur N3300 which are aliphatic polyisocyanate compounds based on hexamethylenebisisocyanate. Desmodur N3400 is hexamethylene diisocyanate (HDI) uretdione and is also referred to as an HDI-dimer; and Desmodur N3300 is HDI-isocyanerate and is also referred to as an HDI-trimer. Desmodur is a trademark of Covestro and Desmodur products are available from Covestro.

In another embodiment, the polyisocyanate compound containing isocyanate moieties useful as the isocyanate component (a) in the present invention adhesive can include, for example, isocyanate-containing prepolymers (or isocyanate-terminated prepolymers). For example, the prepolymers may include MDI end-capped prepolymers formed from EO (ethylene oxide) and/or PO (propylene oxide) based polyol compounds such as diols, triols, or mixtures thereof. The prepolymers may have an EW of up to about 2,500 in one embodiment, and from about to about 5,000 in another embodiment, from about 1,000 to about 4,000 in still another embodiment, and from about 2,000 to about 3,500 in yet another embodiment.

In one preferred embodiment, the isocyanate component (a) preferably is a mixture of: (1) one or more isocyanate-terminated prepolymers having at least 2 isocyanate groups per molecule and an isocyanate EW of from about 700 to about 3,500, and (2) one or more low EW polyisocyanate compounds that have an isocyanate EW of up to about 350 and from about 2 to about 4 isocyanate groups per molecule. When such a mixture is present, the prepolymer may constitute from about 20 weight percent (wt %) to about 80 wt % of the weight of the isocyanate component (a) in one general embodiment. In some other embodiments of the mixture, the prepolymer may constitute from about 20 wt % to about 70 wt % in one embodiment, from about 20 wt % to about 65 wt % in another embodiment, or from about 30 wt % to about 60 wt % in still another embodiment, of the weight of the isocyanate component (a). When such a mixture is present, the low EW polyisocyanate compound may constitute from about 1 wt % to about 50 wt % of weight of the isocyanate component (a) in one embodiment. The isocyanate content in the isocyanate component (a) may be about 1 wt % or greater in one embodiment, about 6 wt % or greater in another embodiment, about 8 wt % or greater in still another embodiment, and about 10 wt % or greater in yet another embodiment. The isocyanate content in the isocyanate functional prepolymers may be about 35 wt % or less in one embodiment, about 30 wt % or less in another embodiment, about 25 wt % or less in still another embodiment, and about 15 wt % or less in yet another embodiment.

In another embodiment, the prepolymer may be a reaction product of one or more diisocyanates having an isocyanate EW of up to about 350 with: (1) at least one homopolymer of poly(propylene oxide) or any other polyol (for example, a polyester polyol, polybutylene oxide and the like.) having an EW of from about 700 to about 3,000 and having a nominal hydroxyl functionality of from about 2 to about 4 in one embodiment and a nominal functionality of from about 2 to about 3 in another embodiment; or (2) a mixture of the above component (1) with a polyether polyol having a MW of from about 2,000 to about 8,000. In a preferred embodiment, up to about 3 parts by weight of the above polyether polyol component (2) per part by weight of component (1) can be used. The polyether polyol may include a copolymer of from about 70 wt % to about 99 wt % propylene oxide and from about 1 wt % to about 30 wt % ethylene oxide; and the copolymer may have a nominal hydroxyl functionality of from about 2 to about 4 in one embodiment and a nominal functionality of from about 2 to about 3 in another embodiment. The copolymer may also have a MW of from about 3,000 to about 5,500 and a nominal functionality of from about 2 to about 3 in still another embodiment.

The reaction of a polyisocyanate compound and one or more polyol compounds produces a prepolymer molecules having a polyether segment that is capped with the polyisocyanate, so the molecules have terminal isocyanate groups. Each prepolymer molecule contains a polyether segment that corresponds to the structure, after removal of hydroxyl groups, of a polyol compound used in the prepolymer-forming reaction. If a mixture of polyol compounds is used to make the prepolymer, a mixture of prepolymer molecules can be formed. For example, in addition to the prepolymer that can be end-capped with a polyol described above, in other embodiments a wide variety of other prepolymers useful in the present invention can be made by molecular weight build-up. For example, the prepolymer can have one diisocyanate in the middle of the chemical structure of the prepolymer with two polyol groups attached to the ends of the structure which can be end-capped with isocyanates.

An isocyanate-terminated prepolymer useful as component (a) of the present invention adhesive formulation has an isocyanate EW of about 700 to about 3,500 in one embodiment, from about 700 to about 3,000 in another embodiment, and from about 1,000 to about 3,000 in still another embodiment. The EW for purposes of the present invention is calculated by adding the weight of the polyol(s) used to prepare the prepolymer and the weight of polyisocyanate(s) consumed in reaction with the polyol(s), and dividing by the number of moles of isocyanate groups in the resulting prepolymer. The polyisocyanate compound used to make the prepolymer can be any of the low EW polyisocyanate compounds mentioned below, or a mixture of two or more of these. The prepolymer has about 2 or more isocyanate groups per molecule in one embodiment, from about 2 to about 4 isocyanate groups per molecule in another embodiment, or from about 2 to about 3 isocyanate groups per molecule in still another embodiment. The isocyanate groups of the prepolymer may be aromatic, aliphatic (including alicyclic), or a mixture of aromatic and aliphatic isocyanate groups. The isocyanate groups on the prepolymer molecules may be aromatic. The low EW polyisocyanate compound(s) may have an isocyanate EW of, for example, from about 80 to about 250 in one embodiment, from about 80 to about 200 in another embodiment, and from about 80 to about 180 in still another embodiment. If a mixture of polyisocyanate compounds is present in the adhesive formulation, the mixture of polyisocyanate compounds may have, for example, an average of from about 2 to about 4 isocyanate groups per molecule in one embodiment and from about 2.3 to about 3.5 isocyanate groups per molecule in another embodiment.

All, or a portion, of the low EW polyisocyanate compound may have aromatic isocyanate groups. Among the useful aromatic polyisocyanate compounds m-phenylene diisocyanate, toluene-2,4-diisocyanate, toluene-2,6-di-isocyanate, naphthyl-ene-1,5-diisocyanate, methoxyphenyl-2,4-diisocyanate, diphenyl-methane-4,4'-diiso-cyanate, diphenylmethane-2,4'-diisocyanate, 4,4'-bi-phenylene diisocyanate, 3,3'-dimeth-oxy-4,4'-biphenyl diisocyanate, 3,3'-dimethyl-4-4'-biphenyl diisocyanate, 3,3'-dimethyl-diphenyl methane-4,4'-diisocyanate, 4,4',4"-triphenyl methane triisocyanate, polymethylene polyphenylisocyanate (PMDI), toluene-2,4,6-triisocyanate, 4,4'-dimethyl-di-phenylmethane-2,2',5,5'-tetraisocyanate and mixtures thereof. Modified aromatic polyisocyanates that contain urethane, urea, biuret, carbodiimide, uretoneimine, allophonate or other groups formed by reaction of isocyanate groups are also useful in the present invention. The aromatic polyisocyanate may be MDI or PMDI (or a mixture thereof that is commonly referred to as "polymeric MDI"), and so-called "liquid MDI" products that are mixtures of MDI and MDI derivatives that have biuret, carbodiimide, uretoneimine and/or allophonate linkages. All or a portion of the low EW polyisocyanate compounds may be one or more aliphatic polyisocyanate compounds. Examples of aliphatic polyisocyanate compounds useful in the present invention may include cyclohexane diisocyanate, 1,3- and/or 1,4-bis(isocyanatomethyl)cyclohexane, 1-methyl-cyclohexane-2,4-diisocyanate, 1-methyl-cyclo-hexane-2,6-diisocyanate, methylene dicyclohexane diisocyanate, isophorone diisocyanate, hexamethylene diisocyanate, and mixtures thereof.

At least some of the polyisocyanate groups present in the polyisocyanate component may be aromatic isocyanate groups. If a mixture of aromatic and aliphatic isocyanate groups is present in the isocyanate component (a), about 50% or more by number are aromatic isocyanate groups in one embodiment and about 75% or more by number are aromatic isocyanate groups in another embodiment. In still another embodiment, from about 80% to about 98% by number of the isocyanate groups may be aromatic, and from about 2% to about 20% by number may be aliphatic isocyanate groups. In yet another embodiment, all of the isocyanate groups of the prepolymer may be aromatic; and the isocyanate groups of the polyisocyanate compound(s) having an isocyanate EW of up to about 350, may be a mixture of about 80% to about 95% aromatic isocyanate groups and about 5% to about 20% aliphatic isocyanate groups.

It is often convenient to prepare an isocyanate-containing prepolymer by combining a polyol compound or a mixture of polyol compounds with an amount of a low EW polyisocyanate compound(s) significantly greater than needed to simply cap the polyol(s). After reaction, the above combination produces a mixture of the prepolymer and unreacted low EW polyisocyanate compounds. If desired, an additional amount of polyisocyanate compound(s) can then be blended into this mixture. The polyol compound(s) may be combined and reacted with an excess of one or more aromatic polyisocyanate compounds to produce a mixture of prepolymer and unreacted starting polyisocyanate compounds, and this mixture then may be combined with one or more aliphatic polyisocyanate compounds. For example, the isocyanate-containing prepolymer may be made by reacting the polyol compound(s) with MDI, PMDI, a polymeric MDI, a derivative of any one or more of these that contains biuret, carbodiimide, uretoneimine and/or allophonate, or a mixture of any two or more of these, to produce a mixture of prepolymer and unreacted starting polyisocyanate compounds, and the mixture can then be combined with one or more aliphatic polyisocyanate compounds, especially an aliphatic polyisocyanate compound based on hexamethylene diisocyanate.

In general, the amount of the isocyanate-containing prepolymer useful in the adhesive formulation can be in the range of from about 0.01 wt % to about 80 wt % in one embodiment; from about 1 wt % to about 70 wt % in another embodiment; from about 1 wt % to about 60 wt % in still another embodiment; and from about 1 wt % to about 55 wt % in yet another embodiment, based on the total weight of the components in the formulation. If the amount of the prepolymer is more than 80 wt %, then the formulation's viscosity may be too low for the components in the formulation to mix with each other. If the amount of prepolymer is less than 0.01 wt %, then the adhesive formulation may not function to provide an operable adhesive.

As aforementioned, the polyol component (b) includes (bi) at least one first polyol compound; (bii) at least one second polyol compound, wherein the second polyol compound is different than the first polyol compound; and (biii) at least one chain extender. The first polyol compound useful in the present invention may be selected from a variety of polyol compounds known in the art such as any of the polyol compounds described in WO2016205252(A), incorporated by reference. Ingredient (bi) of component (b), i.e., the first polyol compound of the polyol component (b), may be a polyether polyol or mixture of polyether polyols. In one general embodiment, each polyether polyol has a hydroxyl EW of from about 400 to about 3,000. The hydroxyl EW of each polyol compound in some embodiments may be, for example, at least about 500 in one embodiment, at least about 800 in another embodiment, and at least about 1,000 in still another embodiment. In other embodiments, for example, the hydroxyl EW may be up to about 3,000 in one embodiment; up to about 2,500 in another embodiment; and up to about 2,000 in still another embodiment. Each such polyether polyol has a nominal hydroxyl functionality of from about 2 to about 3. By "nominal functionality" of a polyether polyol, it is meant the average number of oxyalkylatable hydrogen atoms on the initiator compound that is alkoxyated to form the polyether polyol. The actual functionalities of the polyether polyol(s) may be somewhat lower than the nominal functionality, due to side-reactions that occur during the alkoxylation process. In the case of a mixture of polyether polyols, the number average nominal functionality may be from about 2 to about 3 in one embodiment and from about 2.5 to about 3 in another embodiment.

The polyether polyol(s) useful in the present invention as the first polyol compound, component (bi), may be selected from homopolymers of propylene oxide and copolymers of about 70% to about 99% by weight propylene oxide and about 1% to about 30% by weight ethylene oxide. Such a copolymer of propylene oxide and ethylene oxide is generally preferred if a single polyether polyol is present. If two or more polyether polyols are present, it is preferred that at least one is such a copolymer of propylene oxide and ethylene oxide. In the case of a copolymer, the propylene oxide and ethylene oxide may be randomly copolymerized, block copolymerized, or both. In some embodiments, about 50% or more of the hydroxyl groups of the polyether polyol or mixture of polyether polyols are primary hydroxyl, with the remainder being secondary hydroxyl groups. About 70% or more of the hydroxyl groups in the polyether polyol or mixture thereof may be primary hydroxyl. The polyether polyol(s) (component (bi) of the polyol component (b)) may constitute about 35 wt % or greater of the polyol component (b) in one embodiment, about 40 wt % or greater in another embodiment, and about 50 wt % or greater in still another embodiment. In other embodiments, the polyether polyol(s) component (bi) of the polyol component (b), may constitute about 80 wt % or less in one embodiment, about 65 wt % or less in another embodiment, and about 55 wt % or less in still another embodiment.

In a preferred embodiment, the first polyol compound can be, for example, a polyetherpolyol or a polyester polyol with an EW of >about 200 and having a functionality of >about 1. Other suitable polyol compounds useful in the polyol component (b) in the present invention may include for example polypropylene based diols such as Voranol™ 1010L with an equivalent molecular weight of about 500 g/mol, Voranol™ 2000L with an equivalent molecular weight of about 1,000 g/mol, glycerin-initiated ethylene oxide based propoxylated triol Voranol™ CP4610 with an average equivalent molecular weight of about 1,600 g/mol; and mixtures thereof.

"High functional polyol compounds", that is, polyol compounds with a functionality of >about 2.3 (e.g. >about 3), can also be used in the present invention. For example, a highly functional polyol compound useful in the present invention may include Voranol 280. Voranol 280 is a sucrose initiated oxypropylene-oxyethylene polyol having a hydroxyl number of 280. Voranol is a trademark of The Dow Chemical Company and Voranol products are available from The Dow Chemical Company.

In general, the amount of the first polyol compound in the adhesive formulation can be in the range of from about 1 wt % to about 90 wt % in one embodiment; from about 5 wt % to about 80 wt % in another embodiment; from about 10 wt % to about 70 wt % in still another embodiment; and from about 20 wt % to about 60 wt % in yet another embodiment based on the total weight of the components in the formulation. If the amount of the first polyol compound is more than 90 wt %, then the viscosity of the resulting formulation would be too low; and if the amount of the first polyol compound is less than 1 wt %, then the OH-number of the polyol component (a) would not be sufficient and/or the mechanical properties of the adhesive formulation would be compromised.

Ingredient (bii) of component (b), i.e., the second polyol compound of the polyol component (b), may be a polyol compound or a mixture of polyol compounds. The second polyol compound useful in the present invention may be selected from a variety of polyol compounds having a functionality of >about 2 and an EW of <about 200. The second polyol compound can be, for example, any one or more of the above-described first polyol compounds so long as the second polyol compound is different than the first polyol compound; and the second polyol compound has a functionality of >about 2 and an EW of <about 200. The second polyol compound may include, for example, 1,2,3-propanetriol (also known as glycerin) or other isomers of glycerin; 1,2,4-butanetriol (or other isomers of 1,2,4-butanetriol); any other polyol compound with about 3 or more hydroxyl groups and with a molecular weight of <about 600 g/mol; and mixtures thereof.

Generally, the amount of the second polyol compound in the adhesive formulation can be in the range of from about 0.1 wt % to about 10 wt % in one embodiment; from about 0.1 wt % to about 7.5 wt % in another embodiment; from about 0.1 wt % to about 5 wt % in still another embodiment; and from about 0.2 wt % to about 3 wt % in yet another embodiment based on the total weight of the components in the formulation. If the amount of the second polyol compound is more than 10 wt %, then the mechanical properties of the adhesive formulation may be compromised; and if the amount of the second polyol compound is less than 0.1 wt %, then the latency of the adhesive formulation may be compromised.

The chain extender, ingredient (biii) of the polyol component (b), may be one or more aliphatic diol chain extenders. The aliphatic diol chain extender(s) each have a hydroxyl EW of about 200 or less in one embodiment, about 100 or less in another embodiment, about 75 or less in still another embodiment and about 60 or less in yet another embodiment. The aliphatic diol chain extender may have about 2 aliphatic hydroxyl groups per molecule. And, the chain extender useful in the present invention may include short chain extender diols with an EW of from about 10 to about 59. In one embodiment, examples of the aliphatic diol chain extenders may include monoethylene glycol (MEG), diethylene glycol, triethylene glycol, 1,2-propane diol, 1,3-propane diol, 2,3-dimethyl-1,3-propane diol, dipropylene glycol, tripropylene glycol, 1,4-butane diol, 1,6-hexane diol, other linear or branched alkylene diols having up to about 20 carbon atoms, and mixtures thereof. In a preferred embodiment, the aliphatic diol chain extender may include monoethylene glycol, 1,4-butanediol, and a mixture thereof.

The aliphatic diol chain extender or mixture thereof may be present in an amount of from about 2.5 to about 6 equivalents per equivalent of ingredients (bi) and (bii) of the polyol component (b). The chain extender may be present in an amount of about 0.1 wt % or greater of the polyol component (b) in one embodiment, about 1.0 wt % or greater in another embodiment, about 2.0 wt % or greater in still another embodiment, and about 3.0 wt % or greater in yet another embodiment. The chain extender may be present in an amount of about 10 wt % or less of the polyol component (b) in one embodiment, about 9 wt % or less in another embodiment, about 8 wt % or less in still another embodiment, about 7 wt % or less in yet another embodiment and about 6 wt % or less in even still another embodiment.

While the second part of the 2 k PU adhesive has been described with reference to a "polyol" component (b), it is well known that other isocyanate-reactive compounds can be used in the present invention. The term "isocyanate-reactive compound" as used herein includes any organic compound having nominally at least two isocyanate-reactive moieties. An "isocyanate-reactive moiety" herein refers to a moiety that can be an active hydrogen-containing moiety; and an "active hydrogen-containing moiety" herein refers to a moiety containing a hydrogen atom which, because of its position in the molecule, displays significant activity according to the Zerewitinoff test described by Wohler in the Journal of the American Chemical Society, Vol. 49, p. 3181 (1927). Illustrative of such isocyanate-reactive moieties, such as active hydrogen-containing moieties, are —COOH, —OH, —NH$_2$, —NH—, —CONH$_2$, —SH, and —CONH—. Exemplary active hydrogen-containing compounds, i.e., isocyanate reactive moiety containing compounds, useful in the present invention, may include polyols, polyamines, polymercaptans and polyacids. In a preferred embodiment, the isocyanate-reactive compound useful in the present invention, is a polyol compound; and in another preferred embodiment, the polyol compound can be a polyether polyol compound.

The adhesive formulation of the present invention may optionally contain at least one catalyst. The optional catalyst can be present in the isocyanate component (a) and/or in the polyol component (b). While the catalyst is optional in the present invention, the catalyst is generally preferred to be present in the composition to accelerate the reaction of the polyol and isocyanate components. The catalyst may include, for example, one or more latent room temperature (about 25° C.) organometallic catalysts. The latent room temperature organometallic catalysts may contain tin, zinc or bismuth. For example, the latent room temperature organometallic catalyst may include one or more catalysts from the following group of: zinc alkanoates, bismuth alkanoates, dialkyl tin alkanoates, dialkyl tin mercaptides, dialkyl tin bis(alkyl-mercaptoacetates), dialkyltin thioglycolates, or mixtures thereof.

In one embodiment, the catalyst useful in the present invention may be a tin-containing (or tin-based) latent room temperature organometallic catalyst such as the aforementioned one or more catalysts selected from the group of: dialkyl tin mercaptides, dialkyl tin bis(alkylmercaptoacetates), dialkyltin thioglycolates, or mixtures thereof. For example, the latent tin-containing organometallic catalysts useful in the present invention adhesive composition may include one or more tin-based catalysts selected from dioctyltinmercaptide; dibutylmercaptidem; dibutylmercaptide; dibutylmercaptide; bis(dodecylthio)dimethylstannane; dimethytin bis(2-ethylhexylmercaptoacetate); dioctylcarboxylates; dioctyltinneodecanoate; and mixtures thereof.

Another catalyst useful in the adhesive formulation of the present invention includes for example, any catalyst that can be further heat activated (referred to as "thermosensitive catalysts"). In one embodiment, such thermosensitive catalysts may include for example amines-based solid amine catalysts such as one or more cyclic amidine catalyst compounds selected from the group of: 1,8-diazabicyclo[5.4.0]undec-7-ene (DBU); 1,5-diazabicyclo[4.3.0]non-5-ene; and mixtures thereof.

In another embodiment, the adhesive formulation of the present invention may include a combination of at least one of the above latent tin-containing catalysts and at least one of the above thermosensitive amine-based catalysts. Both the tin-containing organic catalyst and the amine-based catalyst can be readily formulated into the isocyanate component (a), the polyol component (b), or both the isocyanate component (a) and the polyol component (b), to form the 2K PU adhesive of the present invention.

In still another embodiment, any non-tin-based metal-organic catalyst which exhibits a similar curing kinetics/profile of the tin-based catalyst described above may be used as the catalyst ingredient in the adhesive formulation of the present invention. For example, useful bismuth-based catalysts may include bismuth(III)-neodecanaote; and useful zin-based catalysts may include zinc-neodecanaote; and mixtures of these catalysts.

In yet another embodiment, non-tin-based catalysts or non-amine-based catalysts useful in the present invention may include carboxylic acid blocked catalysts such as DBU carboxylic acid blocked catalysts. For example, a DBU carboxylic acid blocked catalyst useful in the present invention may include TOYOCAT DB41 (a carboxylic DBU salt available from TOSOH), POLYCAT SA-102/10 (a carboxylic DBU salt available from Air Products), and mixtures thereof. Other catalysts useful in the present invention may include acid blocked amines including for example tertiary amines and organic acid-based catalysts such as TOYOCAT DB40, TOYOCAT DB60, and TOYOCAT DB70 available from TOSOH; 1H-1,2,4-triazole-based amine catalysts such as TOYOCAT DB30 available from TOSOH; and mixtures thereof. Any other known thermosensitive amine catalysts may also be used in the present invention such as TOYOCAT F22 available from TOSOH; triethylenediamine (TEDA); and the like; and mixtures thereof. In one preferred embodiment, the catalyst useful in the present invention may be selected, for example, from tin catalysts such as di-n-octyltin bis[isooctylmercaptoacetate]; from amine catalysts such as POLYCAT SA 1/10, and TOYOCAT DB60; and mixtures thereof.

In general, the amount of the catalyst in the adhesive formulation can be in the range of from about 0.005 wt % to about 2.0 wt % in one embodiment; from about 0.01 wt % to about 1.0 wt % in another embodiment; and from about 0.015 wt. % to about 0.065 wt % in still another embodiment based on the total weight of the components in the formulation. In one illustrative embodiment, for example when a tin catalyst such as di-n-octyltin bis[isooctylmercaptoacetate] is used in the adhesive formulation, the concentration of such catalyst in the formulation can be from about 0.005 wt % to about 1.0 wt % in one embodiment; from about 0.02 wt % to about 0.08 wt % in another embodiment; and from about 0.03 wt. % to about 0.05 wt % in still another embodiment based on the molecular weight of the tin catalyst di-n-octyltin bis[isooctylmercaptoacetate].

In another illustrative embodiment, for example, when a thermosensitive amine catalyst such as POLYCAT SA 1/10 is used in the adhesive formulation, the concentration of such catalyst in the formulation can be from about 0.01 wt % to about 2.0 wt % in one embodiment; from about 0.01 wt % to about 1.0 wt % in another embodiment; and from about 0.015 wt. % to about 0.025 wt % in still another embodiment based on the molecular weight of the POLYCAT SA 1/10.

In still another illustrative embodiment, for example, when a catalyst such as TOYOCAT DB60 is used in the adhesive formulation, the concentration of such catalyst in the formulation can be from about 0.01 wt % to about 2.0 wt % in one embodiment; from about 0.01 wt % to about 1.0 wt % in another embodiment; and from about 0.045 wt. % to about 0.065 wt % in still another embodiment based on the molecular weight of the TOYOCAT DB60.

If the concentration of the catalyst is lower than about 0.005 wt %, the catalyst used may not be effectively active in the formulation and the storage stability of the resulting formulation may be "poor", that is, for example, any residual water present in the formulation can deactivate the small amounts of catalyst. If the concentration of the catalyst is more than about 2.0 wt %, the reaction of the components present in the formulation may be too quick resulting in a short open time, that is, an open time of for example less than about 3 min may occur. In addition, a high catalyst level (e.g., >about 2.0 wt %) in the formulation may lead to an increase in handling and formulation costs for the resulting formulation.

The adhesive formulation of the present invention may optionally contain at least one filler. The optional filler can be at least one particulate filler. The particulate filler is a solid material at room temperature, is not soluble in the other ingredients of the polyol component (b) or in the isocyanate component (a) or any ingredient thereof. The filler is a material that does not melt, volatilize or degrade under the conditions of the curing reaction between the polyol and isocyanate components. The filler may be, for example, an inorganic filler such as glass, silica, boron oxide, boron nitride, titanium oxide, titanium nitride, fly ash, calcium carbonate, and various alumina-silicates including clays such as wollastonite and kaolin, and the like; metal particles such as iron, titanium, aluminum, copper, brass, bronze and the like; thermoset polymer particles such as polyurethane, cured particles of an epoxy, phenol-formaldehyde, or cresol-formaldehyde resin, crosslinked polystyrene, and the like; thermoplastics such as polystyrene, styrene acrylonitrile copolymers, polyimide, polyamide-imide, polyether ketone, polyether-ether ketone, polyethyleneimine, poly(p-phenylene sulfide), polyoxymethylene, polycarbonate and the like; and various types of carbon such as activated carbon, graphite, carbon black and the like; and mixtures thereof.

The particulate filler may be in the form of particles having a size of from about 50 nanometers (nm) to about 100 micrometers (μm) in one general embodiment. In other embodiments, the fillers may have a particle size (d50) of about 250 nm or greater in one embodiment, about 500 nm or greater in another embodiment and about 1 μm or greater in still another embodiment. In other embodiments, the fillers may have a particle size (d50) of about 50 μm or less in one embodiment, about 25 μm or less in another embodiment, and about 10 μm or less in still another embodiment. Particles sizes are conveniently measured using dynamic light scattering methods, or laser diffraction methods for particles having a size below about 100 nm.

In some embodiments, particulate filler particles may have an aspect ratio of up to about 5 in one embodiment, an aspect ratio of up to about 2 in another embodiment, and an aspect ratio of up to about 1.5 in still another embodiment. In other embodiments, a portion or all of the filler particles can be grafted onto one or more of the polyether polyol(s) of the polyol component (b).

In general, when a filler is present in the adhesive formulation, the filler constitutes no more than about 80 wt % of the total weight of the adhesive formulation in one embodiment. In other embodiments, the amount of the filler present in the adhesive formulation can be generally in the range of from about 0.1 wt % to about 80 wt % in one embodiment; from about 0.1 wt % to about 70 wt % in another embodiment; from about 0.1 wt % to about 60 wt % in still another embodiment; from about 0.1 wt % to about 50 wt % in yet another embodiment; from about 0.1 wt % to about 40 wt % in even still another embodiment; from about 0.1 wt % to about 30 wt % in even yet another embodiment; from about 0.1 wt % to about 25 wt % in even still another embodiment; and from about 0.1 wt % to about 20 wt % in even yet another embodiment, based on the total weight of the components in the formulation.

The optional filler can be present in the isocyanate component (a) and/or in the polyol component (b). For example, in one illustrative embodiment of the present invention, the filler may be carbon black and a predetermined concentration of the carbon black can be present in the isocyanate component (a). When carbon black and no other filler is present in the isocyanate component (a), the carbon black filler may constitute, for example, from about 1 wt % to about 50 wt % of the isocyanate component (a) in one embodiment; from about 2 wt % to about 40 wt % in another embodiment; from about 5 wt % to about 30 wt % in still another embodiment; and from about 10 wt % to about 25 wt % in yet another embodiment, based on the weight of the isocyanate component (a).

In another illustrative embodiment of the present invention, a predetermined concentration of filler can be present in the polyol component (b). When a filler is present in the polyol component (b), the filler may constitute, for example, from about 1 wt % to about 80 wt % of the polyol component (b) in one embodiment; from about 5 wt % to about 70 wt % in another embodiment; from about 10 wt % to about 60 wt % in still another embodiment; and from about 20 wt % to about 60 wt % in yet another embodiment, based on the weight of the polyol component (a).

The filler present in the polyol component (b) may be the same as the filler in the isocyanate component (a); or the filler present in the polyol component (b) may be different from the filler in the isocyanate component (a). For example, in one preferred embodiment, a carbon black filler may be used in the isocyanate component (a) in a concentration of, for example, from about 15 wt % to about 20 wt %; and a calcinated clay, calcium carbonate, or talc may be used in the polyol component (b) in an amount of, for example, from about 30 wt % to about 60 wt %. The filler can be readily formulated into the isocyanate component (a), the polyol component (b), or both the isocyanate component (a) and the polyol component (b), to form the 2K PU adhesive of the present invention.

The adhesive formulation of the present invention may further include one or more other optional components which can be present in the polyol component (b) and/or the isocyanate component (a). For example, another optional ingredient useful in the present invention may include one or more dispersing aids, which wet the surface of the filler particles and help them disperse into the polyether polyol(s). These may also have the effect of reducing viscosity. Among these dispersing aids are, for example, various dispersing agents sold by BYK Chemie under the BYK, DISPERBYK and ANTI-TERRA-U tradenames, such as alkylammonium salt of a low-molecular-weight polycarboxylic acid polymer and salts of unsaturated polyamine amides and low-molecular acidic polyesters, and fluorinated surfactants such as FC-4430, FC-4432 and FC-4434 from 3M Corporation. When present in the polyol component (b), the above dispersing aids may constitute, for example, up to about 2 wt % of the polyol component in one embodiment and up to about 1 wt % of the polyol component in another embodiment.

Another useful optional ingredient useful in the present invention, particularly when used in the polyol component (b), may include a desiccant such as fumed silica, hydrophobically modified fumed silica, silica gel, aerogel, various zeolites, molecular sieves, and the like; and mixtures thereof. For example, when present in the component (b), one or more desiccants may constitute about 1 wt % or greater based on the weight of the polyol component in one embodiment, about 5 wt % or less in another embodiment, and about 4 wt % or less in still another embodiment. In another embodiment, the desiccants may be absent from the polyol component or from the adhesive composition.

Optionally, the adhesive formulation of the present invention may be formulated with a wide variety of other optional additives to enable performance of specific functions while maintaining the excellent benefits/properties of the present adhesive product. For example, in one embodiment, the optional additives useful in the formulation may include gas- and water scavengers to avoid additional water uptake of the adhesive and to avoid NCO-water reaction. Such undesired reaction may result in blister formation in the adhesive due to $CO_2$ emission caused by the reaction of NCO with water.

In another embodiment, compatibilizers may be used in the formulation to further improve the wetting performance as well as to improve the mixing between the polyol component (b) and the isocyanate component (a).

In still another embodiment, chemical rheology modifiers may be used in the formulation. Generally, for example, different grades of polyamine compounds with different molecular weights and functionalities can be used in the present invention. In one embodiment, the polyamine compounds include for example any one of more of the following compounds: the trimer Jeffamine T 403 having a molecular weight of 403 g/mol, the dimer Jeffamine D 400 having a molecular weight of 400 g/mol, the dimer Jeffamine D200 having a molecular weight of 200 g/mol, and mixtures thereof. Chemical rheology modifiers can be used in the present invention to provide a fast initial gelling of the formulation which in turn provides the benefit of good sag resistance. Additionally, the fast increase of viscosity upon curing the formulation reduces the risk of $CO_2$ formation in a heat accelerated curing process. Mixtures of additional optional compounds or additives may be added to the adhesive formulation of the present invention as desired.

The optional component, when used in the adhesive formulation, can be present in an amount generally in the range of from 0 wt % to about 15 wt % in one embodiment; from about 0.1 wt % to about 10 wt % in another embodiment; and from about 1 wt % to about 5 wt % in still another embodiment. In one preferred embodiment, when a molecular sieve is used, the amount of molecular sieve can be for example from about 1 wt % to about 5 wt %. In another preferred embodiment, when an amine product such as Jeffamine product is used, the amount of Jeffamine can be for example from about 0.1 wt % to about 2 wt %.

In one broad embodiment, the process for preparing the 2K PU adhesive formulation of the present invention includes providing at least one isocyanate component (a), and providing at least one polyol component (b) as described above. The polyol component (b), in a preferred embodiment, comprises (bi) at least one first polyol compound; (bii) at least one second polyol compound having a functionality of >about 2 and an EW of <about 200; and (biii) at least one chain extender having about 2 hydroxyl (OH) groups and an EW of <about 200. When the adhesive of the present invention is ready to be used to bond substrates together, the above components (a) and (b) can be mixed, admixed or blended together which results in a reaction product when the combination of components (a) and (b) are cured. One or more additional optional components may be added to the formulation as desired. For example, at least one catalyst and/or at least one filler may be added to the adhesive formulation in either component (a), component (b), or both before the components (a) and (b) are mixed together or after the components (a) and (b) are mixed together.

While the amount of the isocyanate component (a) and the amount of the polyol component (b) useful in making the reaction product constituting the adhesive formulation can vary, once the isocyanate component (a) and the polyol component (b) are formulated (separately and individually) and the two components are ready for combining to form the reaction product adhesive, the isocyanate component (a) and the polyol component (b) are generally mixed at a 1:1 ratio by volume. For example, the ratio of the isocyanate component (a) to the polyol component (b) can be in the range of from about 198:2 to about 2:198 in one embodiment, from about 195:5 to about 5:195 in another embodiment, from about 10:190 to about 190:10 in still another embodiment, from about 20:180 to about 180:20 in yet another embodiment, from about 70:130 to about 130:70 in even still another embodiment; from about 80:120 to about 120:80 in even yet another embodiment; from about 90:110 to about 110:90 in still another embodiment; from about 95:105 to about 105:95 in yet another embodiment; and from about 98:102 to about 102:98 in even still another embodiment. If the concentration ratio of the isocyanate component (a) to the polyol component (b) is outside the range of about 198:2 to about 2:198, the adhesive formulation may not exhibit effective adhesion or the adhesion may be poor or nonexistent. If the concentration ratio of the isocyanate component (a) to the polyol component (b) is outside the range of about 198:2 to about 2:198, the formulation may not exhibit good mechanical properties or good rheological properties; and/or a high amount of NCO may form in the formulation which may detrimentally lead to a brittle product, i.e., a product having a low elongation to break.

In making component (a) and component (b), separately and individually, the required ingredients and the optional ingredients that can be mixed together in the desired concentrations discussed above and at a temperature of from about 5° C. to about 80° C. in one embodiment; from about 10° C. to about 60° C. in another embodiment; and from about 15° C. to about 50° C. in still another embodiment. In one preferred embodiment, the mixing of the above ingredients to form components (a) and (b) may be carried out under vacuum. The order of mixing of the ingredients is not critical and two or more compounds can be mixed together followed by addition of the remaining ingredients. The adhesive formulation ingredients that make up components (a) and (b) may be mixed together by any known mixing process and equipment.

In another broad embodiment, the present invention includes a process of bonding two substrates, comprising forming a layer of the 2K PU adhesive at a bondline between two substrates, and curing the layer at the bondline to form a cured adhesive bonded to each of the substrates. For example, the process may comprise combining the isocyanate component (a) with the polyol component (b) of the two-component polyurethane adhesive, forming a layer of the adhesive at a bondline between two substrates to form an assembly, partially curing the adhesive layer at the bondline by applying heat or infrared radiation to a portion of the assembly, and, in a subsequent and separate curing step, completing the cure of the adhesive layer.

The application of the 2K PU adhesive to the substrates to be adhered together can be carried out by any known equipment such as metering/mixing/dispensing equipment which can apply a predetermined amount of the isocyanate component (a) and the polyol component (b), in combination (as an adhesive), to selective portions of the substrates. For example, in an automotive manufacturing process, components (a) and (b) are provided in two separate, several gallon-sized tank containers. Then component (a) is drawn from one tank and, at the same time, component (b) is drawn from another tank and both streams are combined together using a known static or dynamic mixer as the combined adhesive components are applied to the substrates. The partial curing step can be performed by curing only one or more predetermined, localized portions of the adhesive layer at the bondline by applying heat only to the one or more predetermined, localized portions of the assembly to produce an adhesive layer having at least partially cured portions and uncured portions, and the uncured portions of the adhesive layer then can be cured in the subsequent and separate curing step.

In one preferred general embodiment, the process of adhering at least a first substrate to at least a second substrate may comprise the steps of: (1) contacting the polyol component (b) and the isocyanate component (a) as disclosed herein and mixing the components to form a homogeneous adhesive mixture; (2) applying the adhesive mixture to at least a portion of the first substrate; (3) contacting a second substrate with the first substrate such that the mixture is disposed between the first and second substrate forming a bondline; and (4) exposing at least a portion of the mixture to heat under conditions such that the mixture partially cures sufficiently such that the first and second substrate are bonded sufficiently, i.e., with a sufficient strength, such that the substrates can be moved. The process may further optionally include a step (5) of heating the two partially cured substrates at a temperature for a time to fully cure the mixture so as to bond the two substrates together. The heat may be applied in step (4) by any known heating means such as by infrared heating. The time between steps (4) and (5) may be about 1 hr or more in one embodiment and about 24 hr or more in another embodiment; and any time in between the above two time periods or more in still other embodiments.

By curing the 2 k PU adhesive composition of the present invention, a structure is formed comprising two or more substrates bonded together with the cured adhesive based on the curable adhesive composition disclosed herein wherein the cured adhesive is disposed between portions of each of the substrates. In one embodiment, the substrates may comprise dissimilar substrates, i.e., substrates of different materials selected from materials such as metal, glass, plastics, thermoset resins, fiber reinforced plastics, or mixtures thereof. In one preferred embodiment, one or both of the substrates may be fiber reinforced plastic.

One of the advantages of the formulation of the present invention is that a good latency can be achieved while maintaining the mechanical properties of the formulation. While other approaches for increasing latency have previously been tried, for example by using other ingredients such as Voranol 280, such previous attempts lead to the sacrifice of mechanical properties of the adhesive, for example, an elongation at break of <about 150% is achieved. The formulation of the present invention, on the other hand, can achieve a long open time of >about 8 min, a high lap shear strength after 1 h RT of >about 2 MPa while having an elongation at break of >about 150% in one embodiment.

The adhesive formulation of the present invention produced by the process of the present invention has several advantageous properties and benefits compared to conventional adhesive formulations. For example, some of the properties exhibited by the adhesive formulation can include increased latency, longer open times, and faster handling strength build up.

For example, longer open times are exhibited by the adhesive and the open times can be generally >about 8 min in one embodiment, >about 9 min in another embodiment, and >about 10 min in still another embodiment. In other embodiments, the open time exhibited by the formulation of the present invention can be in the range of from >about 8 min to about 20 min in one embodiment; from about 9 min to about 20 min in another embodiment; and from about 10 min to about 20 min in still another embodiment In still another embodiment, the handling strength build-up, as measured by lap shear strength after 1 h RT, of the adhesive formulation of the present invention can be generally >about 1 MPa, >about 1.5 MPa in another embodiment, and >about 2 MPa in still another embodiment. In yet other embodiments, the lap shear strength after 1 h RT of the adhesive formulation may be in the range of from about 1 MPa to about 4 MPa in one embodiment, from about 1.5 MPa to about 4 MPa in another embodiment; and from about 2 MPa to about 3 MPa in another embodiment.

The adhesive formulation of the present invention can also exhibit an elongation at break of >about 150% in one embodiment, >about 170% in another embodiment, and >about 200% in still another embodiment. In other embodiments, the elongation at break of the adhesive formulation may be for example, from >about 150% to <about 600%, from >about 150% to about 300% in another embodiment, and from about 170% to about 200% in still another embodiment.

The 2K polyurethane adhesive of the present invention can be used, for example, to bond together composites; coated metals such as e-coated steel, e-coated aluminum and the like; and sheet-molded compounds (SMC); and mixtures of such materials.

EXAMPLES

The following examples are presented to further illustrate the present invention in detail but are not to be construed as limiting the scope of the claims. Unless otherwise stated all parts and percentages are by weight.

Various raw materials used in the examples are explained as follows:

Desmodur N3400, available from Covestro, is an aliphatic polyisocyanate compound based on hexamethylenebisisocyanate.

Isonate M143 is a liquified MDI with a functionality of 2.2 and a viscosity of 40 mPa-s viscosity. Isonate M143 is available from The Dow Chemical Company (Dow).

Metatin T713 is a tin based dibutyltinmercaptide catalyst; and is available from ACIMA.

Di-n-octyltin bis[isooctylmercaptoacetate], a tin based dioctyltinmercaptide catalyst.

POLYCAT SA-1/10 is a solid DBU (1,8-Diazabicyclo[5.4.0]undec-7-ene) based solid amine catalyst with a phenolic counter ion; and is available from ACIMA.

Voranol 2000L is a polypropylene homopolymer with an average molecular weight of 1,000 g/mol and an OH number of approximately 55 mg KOH/g; and is available from Dow.

Voranol CP4610 is a glycerin-initiated ethylene oxide based propoxylated triol with an average molecular weight of 1,800 g/mol molecular weight and an OH number of approximately 35 mg KOH/g; and is available from Dow.

1,4 butanediol is available from Arco Chemical and distributed by Schweizerhall Chemie.

Polestar 200R is calcined China clay (55% $SiO_2$, 45% $Al_2O_3$) with an average particle size of approximately 2 micrometer (μm) (90%>10 μm), and a BET surface of 8.5 $m^2/g$ and a pH of 6.0-6.5. Polestar 200R is available from IMERYS.

Aerosil R 202 is hydrophobically modified polydimethylsiloxane coated fumed silica; and is available from Evonik Industries.

Printex 30 is a carbon black filler commercially supplied by Alzchem.

Toyocat DB60 is a catalyst based on a salt of a tertiary amine with an organic acid; and is commercially available from Tosoh.

Vestinol 9 is 100% di-isononyl-phthalate and used as a plasticizer in T-715 prepolymer technologies; and is available from Evonik.

Voranol 280 is a sucrose initiated oxypropylene-oxyethylene polyol compound having a hydroxyl number of 280, a functionality of 7, a molecular weight of 400 g/mol, and an EW of 200. Voranol 280 is available from Dow.

VORAFORCET™ 5300 is a Dow resin grade to produced carbon fiber reinforced composites (CFRP) parts in a RTM process.

BETAWIPE™ 4800 is a solvent based adhesion promoter available from Dow Automotive Systems.

Test Methods

The following tests were conducted according to procedures known to those skilled in the art.

Open Time

An adhesive bead of 30 cm-50 cm length was manually extruded onto a polyethylene foil. Manual application of 2K polyurethane adhesives was done from a double cartridge application guns, such as for example a Kröger TS 400 with a mounted static mixer unit 8 millimeters (mm) or 10 mm diameter and 24 mixing elements and an application pressure of minimum 6 bar. The applied adhesive bead is compressed successively with a wooden spatula until no adhesive sticks any longer to the wooden surface of the wooden spatula. The measured time is defined as "open time" of the adhesive.

Reactivity

The reactivity of the 2K PU adhesive is measured by rheology in oscillating mode with a parallel plate 20 mm in diameter, 1 mm plate distance set-up. The reactivity measurements are done at 10 Hz with a constant deformation of 0.062%. The complex viscosity is plotted against the time; and the time at which the slope of viscosity is changed more than 300 is considered to be "the reactivity".

Shear Strength

Shear strengths measurements were performed according to DIN EN 1465 (July 2009) on a suitable shear strength measuring device such as for example shear strength device Zwick 1435 with a FHM 8606.00.00 or 8606.04.00 mounting device. E-coat substrates were Cathoguard 500 e-coated steel panels with the following dimensions: 100 mm×25 mm×0.8 mm. E-coated substrates were cleaned with BETA-CLEAN™ 3350 (heptane) cleaning solvent solution. The flash-off time of the solvent after cleaning prior to adhesive application was 5 min. CFRP substrates were VORAFORCE™ grade panels from DOW CFRP VORAFORCE™ 5300 with the following dimensions: 100 mm×45 mm×2.2 mm. CFRP substrates were grinded or used without cleaning or mechanical pretreatment. When grinding was done, the grinding was done manually, using a 320 grinding pad on wet CFRP panels until homogeneous optical appearance is achieved. The panels are successively dried for 8 hr at 80° C. An adhesive bond dimension of 10 mm×25 mm×1.5 mm was used for the lap shear specimens. The lap shear specimens were tested after 1 hr of curing time at 23° C./50% relative humidity (r.h.) or respectively after the following described heat accelerated curing process.

Tensile Tests

Tensile tests were performed with 7-days RT cured 2 mm thick plaques (referred to as Dogbones 5A) in accordance with the tests described in DIN 527-2 (June 2012).

Examples 1 and 2 and Comparative Examples A-C

The open time of the adhesive compositions of Comparative Examples A to C and Examples 1 and 2 was measured by the rheology reactivity test described above. The lap shear strengths were measured at 1 hr and at 7-days RT with e-coated steel substrates. The adhesion dimensions were 15 mm×25 mm×1.5 mm. Tensile tests were performed on Dogbones 5A test samples as described above. The results of the tests performed on Dogbones 5A samples using various adhesives are described in Table I.

Comparative Example A contains 49 wt % trifunctional Voranol CP 4610 and 5 wt % 1,4-butanediol as chain extender. Comparative Example A does not contain Voranol 280 or a glycerin component. Instead, the Voranol CP 4610 in Comparative Example A will form the soft-segment when the polyol component (PolC) is reacted with the isocyanate component (IsoC). And, the 1,4-butanediol will form the hard-segments when the PolC is reacted with the IsoC. While the results in Table describe that Comparative Example A exhibits good elongation at break (244%), the 1 h RT lap shear strength is only at 1.23 MPa and the open time (or tack free time) is only at 8 min.

A highly functional polyol compound, such as Voranol 280, present in the adhesive formulation can lead to an improved latency indicated by a longer open time and a higher 1 h RT lap shear strength but the use of a highly functional polyol compound, such as Voranol 280 can compromise the mechanical properties of the adhesive formulation having such polyol compound. For example, Comparative Example B contains 5 wt % Voranol 280 and Comparative Example C contains 10 wt % Voranol 280. And, the 1,4-butanediol content in the formulation of Comparative Example B and Comparative Example C is at 4 wt % (Comparative Example B) and 3 wt % (Comparative Example C). The incorporation of Voranol 280 in the adhesive formulations of Comparative Examples B and C leads to an adhesive exhibiting a longer open time and a higher 1 h RT lap shear strength. However, when Voranol 280, particularly when more than 5 wt % of Voranol 280, is added to the compositions of the Comparative Examples, the mechanical properties are significantly reduced as is manifested in a reduced elongation at break of 144% (See Comparative Example B) and 102% (See Comparative Example C). It has been surprisingly discovered that when the chain extender 1,4-butanediol is replaced with a small molecular weight 3 functional polyol compound such as glycerin, both the latency of the formulation is improved while the elongation at break of the adhesive is maintained at a high level (e.g., >150%) as exhibited by the formulations of the present invention (see Examples 1 and 2). This can be attributed to the fact that glycerin has a similar molecular weight as 1,4-butanediol but a higher functionality; and therefore, the higher functionality is introduced into the hard segments.

Example 1 contains 4 wt % 1,4-butanediol and 0.7 wt % glycerin. The open time of the adhesive of Example 1 is 9.5 min which is longer than the open times of Comparative Examples A and B. Also, the 1-hr RT lap shear strength of Example 1 is 2.1 MPa which is higher than the 1-hr RT lap shear strength of Comparative Examples A and B. The elongation at break of 171% for the adhesive of Example 1 is significantly higher than the elongation at break of Comparative Examples B and C.

Example 2 contains 3 wt % 1,4-butanediol and 1.4 wt % glycerin. The open time of the adhesive composition of Example 2 is 13 min which is much longer than the open times of Comparative Examples A, B, and C. Also, the 1-hr RT lap shear strength of the adhesive formulation of Example 2 is 2.98 MPa which is higher than the 1-hr RT lap shear strength of Comparative Examples A, B, and C. The elongation at break of 158% for the adhesive of Example 2 is higher than the elongation at break of Comparative Examples B and C. The results described in Table I show that the use of a trifunctional chain extender, such as glycerin, unexpectedly improves the latency of an adhesive composition and at the same time maintains the good elongation at break property of the adhesive composition.

TABLE I

Adhesive Compositions and Performance Data

| COMPONENTS | Comparative Example A | Comparative Example B | Comparative Example C | Example 1 | Example 2 |
|---|---|---|---|---|---|
| POLYOL COMPONENT | | | | | |
| Voranol 280 (wt %) | — | 5 | 10 | — | — |
| Glycerin (wt %) | — | — | — | 0.7 | 1.4 |
| 1,4-Butanediol (wt %) | 5 | 4 | 3 | 4 | 3 |
| Di-n-octyltin bis[isooctyl mercaptoacetate] (wt %) | 0.045 | 0.04 | 0.04 | 0.045 | 0.045 |
| Polycat SA 1/10 (wt %) | 0.02 | 0.02 | 0.02 | 0.02 | 0.02 |
| Toyocat DB60 (wt %) | 0.05 | 0.05 | 0.05 | 0.05 | 0.05 |
| Voranol CP4610 (wt %) | 48.9 | 45.1 | 41.1 | 48.9 | 48.9 |
| Polestar 200R (wt %) | 43.5 | 40.3 | 40.3 | 43.5 | 43.5 |
| Aerosil R202 (wt %) | 1.5 | 1.5 | 1.5 | 1.5 | 1.5 |
| Molecular Sieves 4A (wt %) | 1 | 4 | 4 | 1 | 1 |
| ISOCYANATE COMPONENT | | | | | |
| Printex 30 (wt %) | 19 | 19 | 19 | | |
| Desmodur N3400 (wt %) | 5 | 5 | 5 | | |
| Isonate M143 (wt %) | 22.5 | 22.5 | 22.5 | | |
| T-715-UK (wt %) | 53.5 | 53.5 | 53.5 | | |
| RESULTS | | | | | |
| Functionality of PolC | 2.155 | 2.482 | 2.905 | 2.286 | 2.431 |
| Open Time (min) | 8 | 8.5 | 10 | 9.5 | 13 |
| 1 hr RT Lap Shear Strength (MPa) | 1.23 | 2.02 | 2.46 ± 0.11 | 2.10 ± 0.04 | 2.98 ± 0.03 |
| 7 days RT Lap Shear Strength (MPa) | 8.22 | 7.95 ± 0.23 | 8.92 ± 0.14 | 8.40 ± 0.47 | 8.00 ± 0.38 |
| E-Modulus (MPa) | 21.3 ± 0.4 | 21.5 ± 0.6 | 20.8 ± 1.0 | 19.7 ± 0.6 | 17.2 ± 0.8 |
| Tensile Strength (MPa) | 9.2 ± 0.1 | 9.2 ± 0.3 | 10.3 ± 0.1 | 9.4 ± 0.1 | 9.8 ± 0.0 |
| Elongation at Break (%) | 244 ± 9.0 | 144 ± 13 | 102 ± 5.4 | 171 ± 14.4 | 158 ± 0.8 |

What is claimed is:

1. An adhesive composition comprising:
   (a) at least one isocyanate component, and
   (b) at least one polyol component, wherein the polyol component comprises (bi) at least one first polyol compound, (bii) at least one second polyol compound having a functionality of greater than about 2 and an equivalent weight of less than about 200; and (biii) at least one chain extender, wherein the chain extender comprises a compound having about 2 hydroxyl groups and an equivalent weight of less than about 200;

wherein the adhesive composition further comprising at least one catalyst being a combination of (a) at least one tin-containing organic compound, and (B) at least one amine compound; and wherein the at least one second polyol compound is glycerin being present at about 0.1 to 10 wt. % based on the total weight of the components in the composition.

2. The composition of claim 1, wherein the at least one catalyst is added to the at least one isocyanate component (a); wherein the at least one catalyst is added to the at least one polyol component (b); or wherein the at least one catalyst is added both to the at least one isocyanate component (a) and to the at least one polyol component (b).

3. The composition of claim 1, including further at least one filler.

4. The composition of claim 3, wherein the at least one filler is selected from the group consisting of inorganic filler particles, metal particles, thermoset polymer particles, thermoplastic particles, carbon black, carbon particles, and mixtures thereof.

5. The composition of claim 3, wherein the at least one filler is added to the at least one isocyanate component (a); wherein the at least one filler is added to the at least one polyol component (b); or wherein the at least one filler is added both to the at least one isocyanate component (a) and to the at least one polyol component (b).

6. The composition of claim 1, wherein the at least one first polyol compound is at least one prepolymer.

7. The composition of claim 6, wherein the at least one prepolymer comprises an isocyanate-functional reaction product of (A) at least one polyol compound and (B) at least one polyisocyanate compound.

8. The composition of claim 1, wherein the at least one isocyanate component (a) is present in the composition at a concentration of from about 0.01 weight percent to about 60 weight percent; and wherein the at least one polyol component (b) is present in the composition at a concentration of from about 0.1 weight percent to about 20 weight percent.

9. The composition of claim 1, wherein the at least one catalyst is present in the composition at a concentration of from about 0.005 weight percent to about 2.0 weight percent.

10. The composition of claim 3, wherein the at least one filler is present in the composition at a concentration of from about 0.1 weight percent to about 60 weight percent.

11. The composition of claim 1, including further at least one gas scavenger, at least one water scavenger, or a mixture thereof.

12. The composition of claim 1, wherein the composition has an open time of from greater than 8 minutes; a lap shear strength, after one hour at 23° C. and 50 percent relative humidity, of greater than about 1.0 Mega Pascal; and an elongation at break of greater than about 150 percent.

* * * * *